United States Patent [19]

Minasi

[11] Patent Number: 5,257,411
[45] Date of Patent: Oct. 26, 1993

[54] RADIO FREQUENCY SWITCHING DEVICE

[75] Inventor: David H. Minasi, Plantation, Fla.

[73] Assignee: Motorola, Inc., Schaumburg, Ill.

[21] Appl. No.: 741,911

[22] Filed: Aug. 8, 1991

[51] Int. Cl.⁵ .............................................. H04B 1/46
[52] U.S. Cl. ........................................ 455/80; 455/82; 455/83; 333/103; 333/247
[58] Field of Search .................................. 455/78-80, 455/82-83; 333/103, 104, 247; 307/503, 259

[56] References Cited

U.S. PATENT DOCUMENTS

| | | | |
|---|---|---|---|
| 3,227,954 | 1/1966 | Fichter, Jr. | 455/82 |
| 4,626,806 | 11/1986 | Rosar et al. | 333/103 |
| 4,803,447 | 2/1989 | Schultz et al. | 333/103 |
| 5,047,829 | 9/1989 | Seymour et al. | 333/247 |
| 5,057,805 | 10/1991 | Kadowaki | 333/247 |

FOREIGN PATENT DOCUMENTS 0101501  6/1983  Japan ................. 333/104

OTHER PUBLICATIONS

Wallington, J. R. "Microstrip Switching Using PIN Diodes", *GEC Journal of Science & Tech.* vol. 43, No. 3 1977 pp. 136-144.
Hallford, B. R. "A 90-dB Microstrip Switch on a Plastic Substrate" *IEEE Transactions;* Jul. 1971; pp. 654-657.

*Primary Examiner*—Reinhard J. Eisenzopf
*Assistant Examiner*—Andrew Faile
*Attorney, Agent, or Firm*—Pedro P. Hernandez

[57] ABSTRACT

A radio frequency switching device package having improved isolation is described. The present invention allows for a radio frequency device packages such as PIN diodes to improve their isolation characteristics by adding an extra wire bond between the anode of the PIN diode and an extra leadframe that is added to the device package.

7 Claims, 3 Drawing Sheets

RADIO FREQUENCY SWITCHING DEVICE

TECHNICAL FIELD

This invention relates generally to electronic components, and more specifically to radio frequency switching devices.

BACKGROUND

A typical example of a radio frequency switching semiconductor device is a PIN diode. A simplified electrical model for such a device in the forward biased mode consists of a resistor and inductor in series (Rs and Lp). The isolation of such a switch is a function of the net impedance (R+jwX). At high frequencies, the series inductance (Lp) is usually the limiting factor for device isolation in common leaded and surface mount devices (SMD).

In FIG. 1, a schematic diagram illustrating the electrical parasitics associated with a conventional PIN diode package, such as the industry standard SOT-23 package is shown. The PIN diode package consists of an anode side 102 and a cathode side 118. Starting at the anode side 102 there is shown a leadframe inductance 104 attributed to the anode side leadframe, which has a typical inductance value of approximately 0.3 nH. A wirebond inductance 108 is formed by the wirebond that couples the diode's anode 110 to the anode side leadframe, at connection point 106. In a typical SOT-23 package, the wirebond will provide for an inductance of approximately 1.5 nH, which is shown by inductance 108. During normal operation, the PIN diode is represented by a series resistance 112 between the diode's anode 110 and cathode 114. Typically, in an SOT-23 package, the cathode 114 of the PIN diode will be directly mounted on the cathode side leadframe which provides for a leadframe inductance 116 between cathode 114 and cathode terminal 118. Leadframe inductance 116 will also have an operational inductance of approximately 0.3 nH.

One of the major problems encountered when designing RF switching circuits (e.g. an antenna switch) with RF switching devices, such as PIN diodes, is the amount of isolation provided by the PIN diodes. In radio communication applications, any increase in the isolation between the receiver and transmitter provided by improved RF switching components utilized in the antenna switch (and other areas) helps improve the overall performance of the radio. A need exists in the art for a way of increasing the isolation provided by RF switching devices without incurring increased cost or part counts.

SUMMARY OF THE INVENTION

Briefly described, the present invention contemplates a radio frequency switching device package having improved isolation characteristics.

According to the invention, a radio frequency switching device package comprises a radio frequency switching device having at least a first and second device port and a first package terminal coupled to the first device port. The radio frequency switching device package further includes a first electrically conductive connection means coupled between the second device port and a second package terminal and a second electrically conductive connection means coupled between the second device port and a third package terminal.

In another aspect of the present invention a radio including a radio frequency switching device package is described.

DETAILED DESCRIPTION OF THE PREFERRED EMBODIMENT

Figure 1:
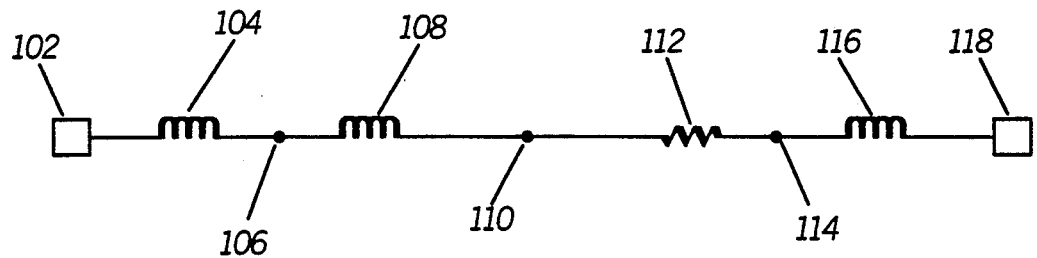
FIG. 1 shows the electrical parasitics associated with a prior art PIN diode.
Figure 2:
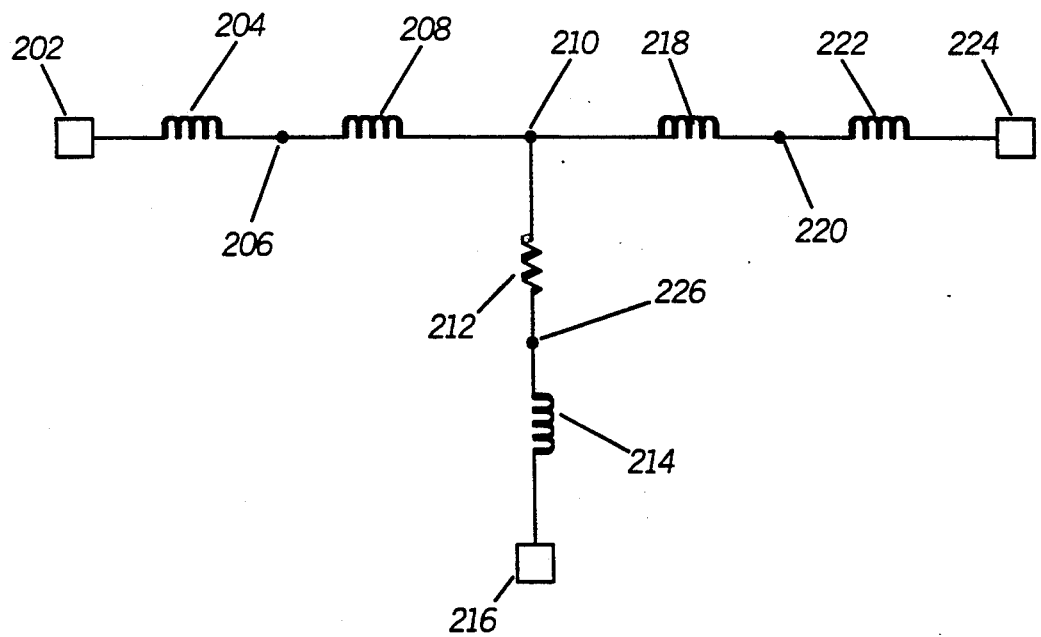
FIG. 2 shows the electrical parasitics associated with a PIN diode in accordance with the present invention.

Referring now to the drawings and in particular to FIG. 2, there is shown a schematic representation of the present invention. FIG. 2 is similar to FIG. 1, except for the addition of an extra leadframe and wirebond connected between the newly added leadframe and the anode 210 of the PIN diode. Starting at the anode side 202 there is shown a leadframe inductance 204 attributed to the anode side leadframe (approximate inductance 0.3 nH). A wirebond inductance 208, is attributed to the wirebond connecting the anode side leadframe, to the anode 210 of the PIN diode. Again, the PIN diode is shown as a resistor 212, between anode 210 and cathode 226. Coupled to cathode 226 is an inductance 214 (approximately 0.3 nH) attributed to the cathode side 216 leadframe. The present invention adds an extra wirebond which is coupled to anode 210 and is shown having an inductance 218 (approximately 1.5 nH). Attached to the other side of the wirebond is another leadframe having an inductance 222 with a value of approximately 0.3 nH which provides for the isolated side or port 224.

Figure 3A:
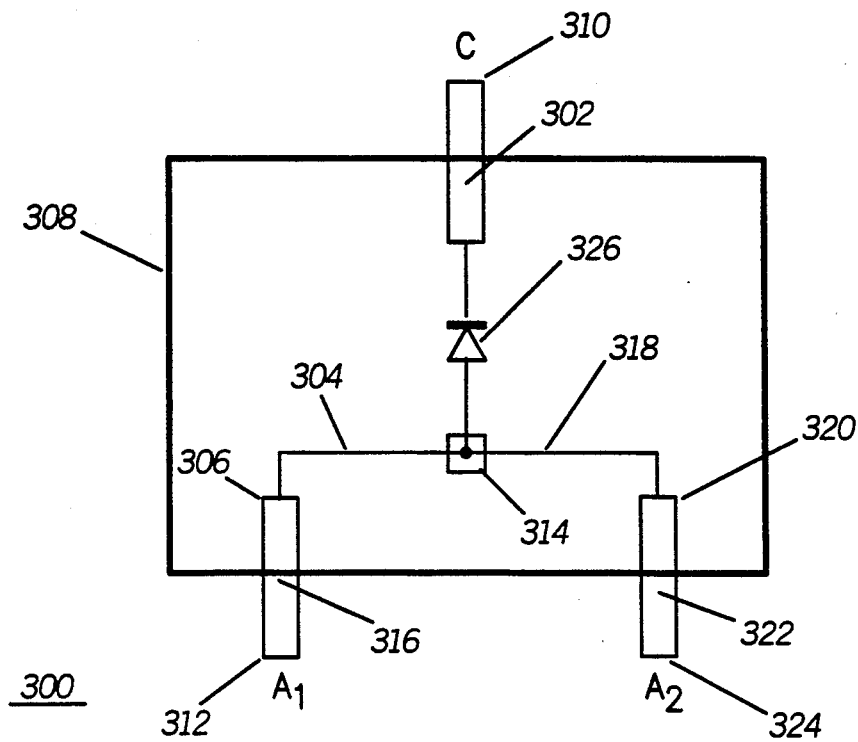
FIG. 3a shows a bonding diagram of a PIN diode in accordance with the present invention.

In FIG. 3a, a bonding diagram 300 in accordance with the present invention is shown. The cathode side 310 includes a first terminal or cathode leadframe 302 attached to the cathode of PIN diode 326. The anode of diode 326 is coupled to a first and second electrically conductive connection means such as conventional wirebonds 304 and 318, respectively. Wirebond 304 is coupled to a second terminal (first anode side 306) or first anode leadframe 316 which provides for a first anode portion 312 that protrudes from the conventional encapsulation material 308 which covers the RF switching device package. The encapsulation material 308 protects the RF switching device 326 from environmental and mechanical factors which may damage the device 326. The second electrically conductive connection means (wirebond 318) is in turn coupled to a third terminal (second anode side 320) or second anode leadframe 322 which provides for a second anode portion 324, protruding from the encapsulation material 308.

Figure 3B:
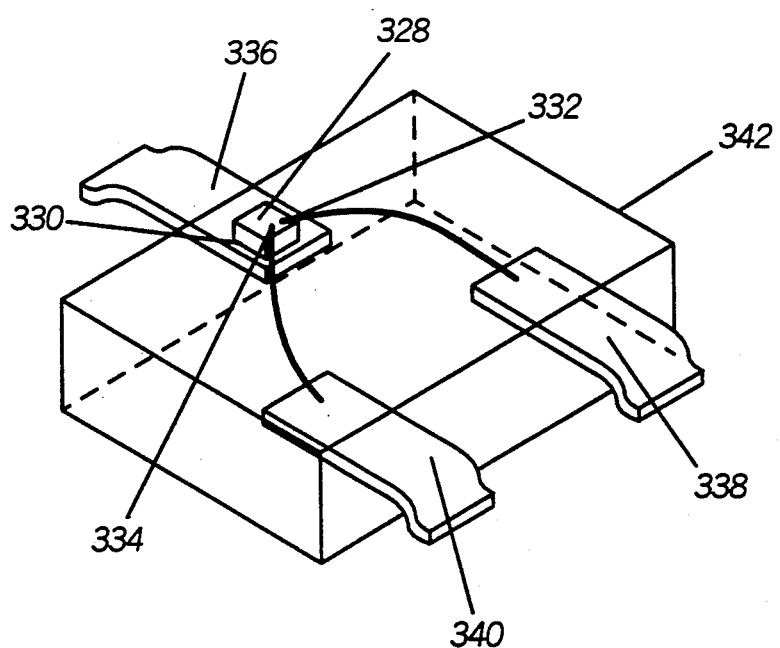
FIG. 3b shows a radio frequency switching device package in accordance with the present invention.

In FIG. 3b, an RF switching device in accordance with the present invention is shown. FIG. 3b is similar to a two terminal SOT-23 package as known in the art except for the addition of the third terminal and wirebond as described above. Typically, the PIN diode (semiconductor chip) is mounted onto the cathode leadframe (first package terminal) 336 with the PIN diode's first device port or cathode side 330 mounted directly onto the leadframe 336. The second device port or anode side 328 is coupled to first and second wirebonds 334 and 332, respectively. The first wirebond is then coupled to a first anode leadframe (second package terminal) 340, while the second wirebond 332 is coupled to a second anode terminal (third package terminal) 338. Finally, the RF switching device is then encapsulated except for portions of the leadframes utilizing conventional encapsulation material 342.

Although the above description has dealt with a PIN diode, those skilled in the art will quickly realize that the present invention can also be utilized with other RF switching devices such as Field Effect Transistors (FET's), by the simple addition of an extra leadframe and wirebond. Either the drain or source terminal of the FET (depends on the type of FET and the polarity of the bias voltage) will include an extra wirebond and lead frame to increase the device's isolation. The present invention can also be utilized in RF attenuator applications since the increased isolation provided by the present invention will help increase the attenuation provided by the RF switching device.

Figure 4:
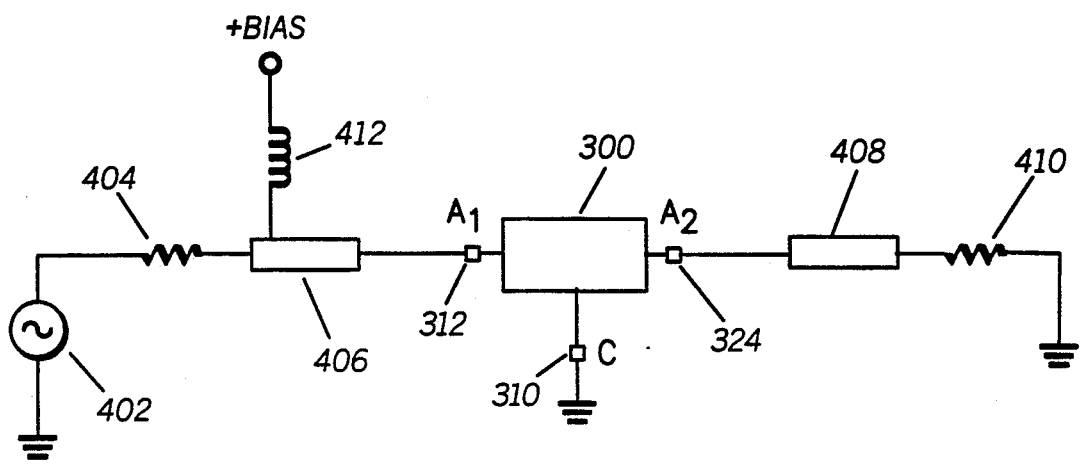
FIG. 4 shows a diagram of a typical test utilized for measuring the isolation of the present invention.

In FIG. 4, an electrical diagram representation of a test fixture used to measure the isolation of the present invention is shown. The test fixture consists of a current source 402 coupled to a 50 ohm impedance line (represented by resistor 404) which is coupled to a first transmission line 406. A positive voltage source is coupled to the first transmission line 406 via a radio frequency choke 412 (choke 412 isolates the voltage source from the radio frequency components produced by the test fixture) in order to bias the test fixture. The first transmission line 406 is then connected directly to first anode terminal (Hot port) 312 of RF switch package 300. The cathode terminal 310 of the RF switch package 300 is connected directly to ground potential. While the second anode terminal (isolated port) 324 is connected to a second transmission line 408 having a 50 ohm impedance 410 which is in turn shorted to ground. Prior to running the tests, a reference short between first transmission line 406 and second transmission line 408 was shown to provide for an isolation of greater than 50 dB over the frequency range of 100-850 MHz.

Utilizing the text fixture shown in FIG. 4, with the RF switch package 300 in place, the RF switch 300 achieved isolation results over the different test frequencies as shown in Table 1.

TABLE 1

| 100 MHz | 200 MHz | 400 MHz | 500 MHz | 850 MHz |
|---|---|---|---|---|
| −35 dB | −32 dB | −27 dB | −25 dB | −23 dB |

While connecting the same device in a conventional 2 leaded prior art configuration (accomplished by shorting terminal "A1" 312 to terminal "A2" 324 together) the isolation results achieved are shown in Table 2.

TABLE 2

| 100 MHz | 200 MHz | 400 MHz | 500 MHz | 850 MHz |
|---|---|---|---|---|
| −25 dB | −19 dB | −13 dB | −12 dB | −10 dB |

As can be seen by the test results, the present invention provides for a minimum of 10 dB (order of magnitude) improvement in the isolation results over the prior art (2 leaded conventional configuration).

Figure 5:
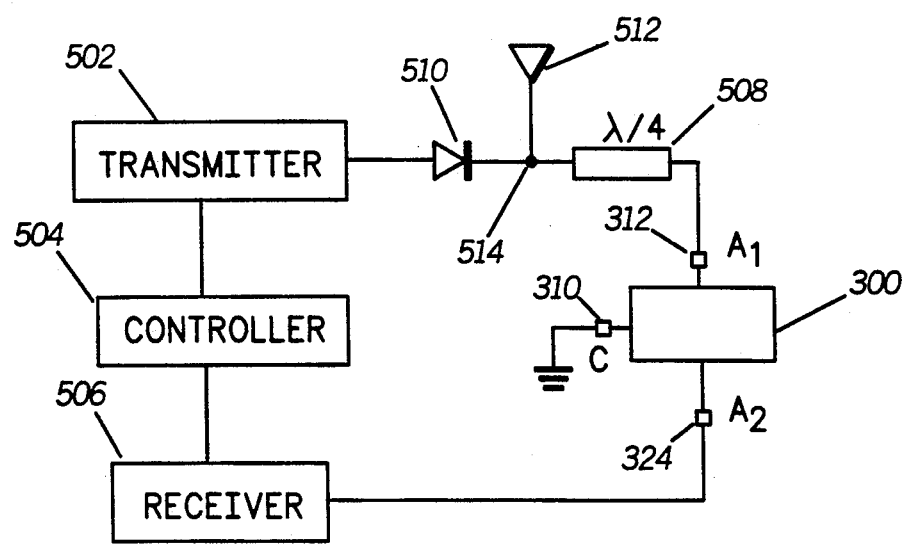
FIG. 5 shows a block diagram of a radio in accordance with the present invention.

In FIG. 5, a block diagram of a radio 500 in accordance with the present invention is shown. Radio 500 comprises a conventional transmitter 502 and conventional receiver 506 which are both controlled by a controller such as microcontroller 504 as known in the art. Transmitter 502 and receiver 506 are selectively coupled to antenna 512 via a three-port antenna switch formed by PIN diode 510 and RF switch 300. The "A2" terminal 324 of RF switch 300 is coupled to receiver 506, while the "A1" terminal 312 is coupled to a quarter-wave transmission line 508. The cathode terminal 310 of the RF switch is connected to ground potential. The cathode side of diode 510 and the other side of the quarter-wave length transmission line 508 are coupled to antenna 512 at the output port 514 of the antenna switch. Diode 510 can be formed by utilizing an RF switch such as switch 300 by "shorting" the "A1" and "A2" together, thereby one can minimize the number of different parts utilized in building radio 500 (or one can utilize a conventional PIN diode).

In the transmit mode, both PIN diodes 510 and 300 are forward biased to a conducting state by the voltage provided by transmitter 502 at the anode terminal of diode 510. The quarter wavelength transmission line 508 is employed to reflect the effective short caused by forward biasing RF switch 300 to ground (cathode terminal 310 coupled to ground) as an open circuit at the output port 514. By utilizing the prevent invention, a higher isolation can be had between output node 514 and receiver 506, thereby increasing the isolation between transmitter 502 and receiver 506.

In summary, the present invention provides an RF switching device 300 that provides higher device isolation at a minimal increase in component cost. The increased isolation provided by the invention will increase the operating performance of devices such as radios utilizing the present invention. The present invention can easily be incorporated into industry standard SOT-23 packages which have three terminals (third terminal not used) by simply adding a wirebond connection to the third unused terminal of the SOT-23 package.

What is claimed is:

1. A PIN diode package having first, second, and third package terminals, comprising:
   a PIN diode having a cathode and anode, the first package terminal being coupled to the cathode;
   a first electrically conductive connection means coupled between the anode and the second package terminal; and
   a second electrically conductive connection means coupled between the anode and the third package terminal;
   wherein the first, second and third package terminals are all leadframes; and
   wherein the first and second electrically conductive means are both wirebonds.

2. The PIN diode package of claim 1, wherein the PIN diode package further includes encapsulation material substantially covering the PIN diode package except for portions of the first, second and third package terminals.

3. The PIN diode package of claim 1, wherein the cathode of the PIN diode is mounted directly on the first package terminal.

4. A radio, comprising:
   a transmitter;
   a receiver; and
   an antenna switch for selectively coupling the transmitter and receiver to an output port, the antenna switch including a radio frequency switching device package, including;
  a radio frequency switching device having first, second and third package terminals and also having at least a first and second device port, the first package terminal being coupled to the first device port;
  a first electrically conductive connection means coupled between the second device port and the second package terminal;
  a second electrically conductive connection means coupled between the second device port and the third package terminal;
wherein the radio frequency switching device is a PIN diode and the first device port is the cathode and the second device port is the anode of the PIN diode, the first, second, and third package terminals are leadframes and the first and second electrically conductive connection means are both wirebonds.

5. The radio of claim 4, wherein the cathode of the PIN diode is mounted directly on the first package terminal.

6. The radio of claim 4, wherein the second package terminal is coupled to the transmitter and the third package terminal is coupled to the receiver.

7. The radio of claim 4, further comprising:
  a second PIN diode having a cathode and an anode;
  an antenna, the cathode of the second PIN diode is coupled to the antenna and the anode of the second PIN diode is coupled to the transmitter;
  a quarter-wave length transmission line having first and second terminals; and
  the first terminal of the quarter-wave length transmission line is coupled to the antenna, the second terminal of the quarter-wave length transmission line is coupled to the second package terminal, the first package terminal is coupled to ground potential and the third package terminal is coupled to the receiver.

* * * * *